United States Patent
Inagaki et al.

(10) Patent No.: US 8,293,408 B2
(45) Date of Patent: Oct. 23, 2012

(54) ACTIVE MATERIALS FOR NON-AQUEOUS ELECTROLYTE BATTERY AND NON-AQUEOUS ELECTROLYTE BATTERY

(75) Inventors: Hiroki Inagaki, Kawasaki (JP); Keigo Hoshina, Yokohama (JP); Norio Takami, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 819 days.

(21) Appl. No.: 12/176,457

(22) Filed: Jul. 21, 2008

(65) Prior Publication Data

US 2009/0081558 A1  Mar. 26, 2009

(30) Foreign Application Priority Data

Sep. 25, 2007 (JP) .................................. 2007-248026

(51) Int. Cl.
*H01M 4/13* (2010.01)
*H01M 4/58* (2010.01)

(52) U.S. Cl. ............... 429/231.5; 429/231.95; 429/224; 429/231.3; 429/337

(58) Field of Classification Search ............... 429/231.5, 429/231.95, 224, 231.3, 337
See application file for complete search history.

(56) References Cited

U.S. PATENT DOCUMENTS

| | | | |
|---|---|---|---|
| 6,221,531 B1 * | 4/2001 | Vaughey et al. | 429/231.1 |
| 2004/0101755 A1 * | 5/2004 | Huang et al. | 429/231.1 |
| 2005/0170250 A1 * | 8/2005 | Ohzuku et al. | 429/231.1 |
| 2006/0095094 A1 * | 5/2006 | Howard et al. | 607/61 |

FOREIGN PATENT DOCUMENTS

| JP | 9-199179 | 7/1997 |
|---|---|---|
| JP | 2006190556 A * | 7/2006 |

OTHER PUBLICATIONS

Machine translation of JP 2006190556 A, PP1-36.*
Camara et al., Synthesis and characterization of Li2ZnTi3O8 spinel using the modified polymeric precursor method, 2003, Elsevier, Materials Chemistry and Physics, 82, pp. 68-72.*
Trendafilova et al., Electrical characteristics of Li2MM'3O8, (M=Mg, Zn; M'=Ti, Sn), Feb. 2007, Journal of Optoelectronics and Advanced Materials, vol. 9, No. 2, pp. 271-274.*
Chinese Office Action issued Apr. 13, 2010, in Patent Application No. 200810165836.1 (with English-language translation).
Nik Reeves, et al., Order-disorder transition in the complex lithium spinel $Li_2CoTi_3O_8$, Journal of Solid State Chemistry, vol. 180, 2007, pp. 1894-1901.

* cited by examiner

*Primary Examiner* — Tony G Soohoo
*Assistant Examiner* — David C Mellon
(74) *Attorney, Agent, or Firm* — Oblon, Spivak, McClelland, Maier & Neustadt, L.L.P.

(57) ABSTRACT

A non-aqueous electrolyte battery including: a positive electrode; a negative electrode including, as an active material, a titanium-containing oxide having a crystal structure belonging to the $P4_332$ space group, which titanium-containing oxide can be carried on one or both surfaces of a current collector; and a non-aqueous electrolyte.

9 Claims, 4 Drawing Sheets

ACTIVE MATERIALS FOR NON-AQUEOUS ELECTROLYTE BATTERY AND NON-AQUEOUS ELECTROLYTE BATTERY

CROSS-REFERENCE TO RELATED APPLICATIONS

This application is based upon and claims the benefit of priority from prior Japanese Patent Application No. 2007-248026, filed Sep. 25, 2007, the entire contents of which are incorporated herein by reference.

BACKGROUND OF THE INVENTION

1. Field of the Invention

This invention relates to active materials for a non-aqueous electrolyte battery and to a non-aqueous electrolyte battery.

2. Description of the Related Art

Studies are now being vigorously made on a non-aqueous electrolyte battery which is designed to be charged and discharged through the movement of lithium ion between a negative electrode and a positive electrode for the purpose of using the battery as a high-energy density battery.

Non-aqueous electrolyte batteries in which an active material for the positive electrode is made of lithium transition metal composite oxides (transition metal is Co, Mn, Ni, etc.) and an active material for the negative electrode is made of carbonaceous materials, are already commercialized.

In recent years, there has been studied to employ, as an active material for the negative electrode of non-aqueous electrolyte battery, spinel-type lithium titanate composite oxides exhibiting higher Li-absorbing/desorbing potential (i.e., about 1.55 V vs Li/Li$^+$) as compared with carbonaceous materials and having a crystal structure belonging to the Fd3-m space group. Since the spinel-type lithium titanate composite oxides are minimal in voluminal changes on the occasion of charging/discharging, they are excellent in charge/discharge cycle characteristics. Further, since there is no possibility in principle that lithium is separated out of the spinel-type lithium titanate composite oxides, the battery can be charged using a large current.

However, in the case of spinel-type lithium titanate, the Li-absorbing/desorbing reaction proceeds at a voltage of about 1.55 V, so that when a lithium transition metal composite oxide, for example, LiCoO$_2$ is used as an active material for the positive electrode, the battery voltage would become 2.3 V. This electrical potential is therefore lower than the battery voltage of 3.8 V that can be derived from a lithium ion secondary battery which has a carbon negative electrode/LiCoO$_2$ positive electrode and is widely commercialized, thus leading to the degradation of energy density.

BRIEF SUMMARY OF THE INVENTION

According to a first aspect of the present invention, there is provided an active material for a non-aqueous electrolyte battery comprising titanium-containing oxide having a crystal structure belonging to the P4$_3$32 space group.

According to a second aspect of the present invention, there is provided a non-aqueous electrolyte battery comprising:
a positive electrode;
a negative electrode comprising titanium-containing oxide having a crystal structure belonging to the P4$_3$32 space group as an active material; and
a non-aqueous electrolyte.

DETAILED DESCRIPTION OF THE INVENTION

Figure 1:
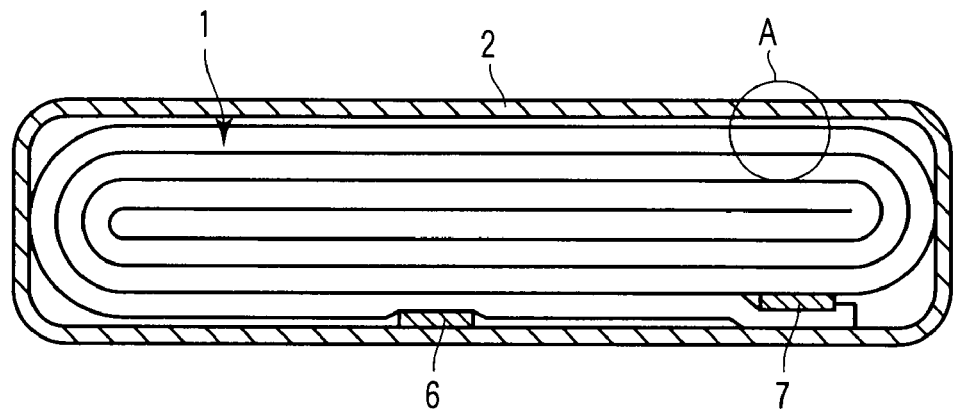
FIG. 1 is a cross-sectional view illustrating a flat type non-aqueous electrolyte battery according to one embodiment.

Next, active materials for a non-aqueous electrolyte battery and the non-aqueous electrolyte batteries according to the embodiments will be explained.

The active materials for a non-aqueous electrolyte battery according to the embodiment comprise titanium-containing oxide having a crystal structure belonging to the P4$_3$32 space group. More specifically, the active materials may be formed of only one titanium-containing oxide or formed of a mixture of two or more titanium-containing oxide.

The titanium-containing oxide can be specifically represented by the general formula Li$_{4x+y}$M$_{6-6x}$Ti$_{3+2x}$O$_{12}$, wherein M is at least one element selected from elements of Groups 2 to 15; x is 0.5<x<0.95; and y is 0≦y≦6.

In the titanium-containing oxide represented by this general formula, M is preferably at least one element selected from the group consisting of Mg, Ca, Sr, Ba, Fe, Co, Ni, Cu and Zn. Among them, Mg, Ca, Sr, Ba and Zn are especially preferable since these elements are effective in suppressing the collapsing of the crystal structure of titanium-containing oxide on the occasion of absorbing and desorbing lithium, thereby exhibiting excellent crystal stability. In addition to this characteristics, Mg and Ca are also effective in realizing the weight-saving of the battery.

In the titanium-containing oxide represented by the general formula, x should preferably be confined to 0.65≦x≦0.85 in order to make it possible to obtain a crystal structure which is minimal in distortion and to improve the stability of crystal structure. More preferably, the general formula should be such that x is confined to 0.65≦x≦0.85 and y is zero. Most preferably, x in the general formula should be confined to 0.70≦x≦0.80.

Especially preferable titanium-containing oxide is at least one oxide selected from the group consisting of Li$_{2+z}$MgTi$_3$O$_8$, Li$_{2+z}$CaTi$_3$O$_8$, Li$_{2+z}$BaTi$_3$O$_8$, Li$_{2+z}$FeTi$_3$O$_8$, Li$_{2+z}$CoTi$_3$O$_8$, Li$_{2+z}$NiTi$_3$O$_8$, Li$_{2+z}$CuTi$_3$O$_8$, Li$_{2+z}$ZnTi$_3$O$_8$ and Li$_{2+z}$SrTi$_3$O$_8$ (wherein z is 0≦z≦4).

The active materials for the non-aqueous electrolyte battery according to the embodiments comprise titanium-containing oxide having a crystal structure belonging to the P4$_3$32 space group and can be used not only in the negative electrode of the battery but also in the positive electrode thereof. Especially, it is more preferable to use these active materials as an active material for the negative electrode. Namely, when the negative electrode is constructed so as to contain these active materials as a negative electrode active material, it is possible to proceed the lithium-absorbing/desorbing reaction at an electrical potential which is greater than 1.0 V relative to the electrical potential of metal lithium but more base than the case where spinel-type lithium titanate is employed and to increase average discharging voltage, thereby making it possible to enhance the energy density of battery. Further, it is possible, with the employment of the non-aqueous electrolyte battery which is provided with a negative electrode containing this negative electrode active material, to realize an increased charge/discharge cycle life which is almost the same as or longer than that can be achieved with the use of the spinel-type lithium titanate.

Especially, by making use of the negative electrode active material comprising titanium-containing oxide represented by the general formula $Li_{4x+y}M_{6-6x}Ti_{3+2x}O_{12}$, it is possible to obtain a non-aqueous electrolyte battery which is more improved in energy density and in charge/discharge cycle life. Furthermore, when the negative electrode active material comprising titanium-containing oxide represented by the general formula is used in combination with a positive electrode comprising, as a positive electrode active material, lithium transition metal composite oxide such as $LiCoO_2$, the battery voltage can be controlled to 2.45 to 2.55 V, thereby enabling the non-aqueous electrolyte battery to become interchangeable with the existing dry cells or with a 2-serial nickel hydrogen secondary battery.

More specifically, when a negative electrode active material constituted by the conventional spinel-type lithium titanate represented by $Li_4TiSO_{12}$ is used in combination with a positive electrode comprising, as a positive electrode active material, $LiCoO_2$ for example, the lithium-absorbing/desorbing potential of lithium titanate to be obtained would become 1.55 V, so that the battery voltage to be obtained would be as low as 2.3 V, thus decreasing the energy density of the battery.

The negative electrode active materials of the embodiments comprising titanium-containing oxide represented by the general formula $Li_{4x+y}M_{6-6x}Ti_{3+2x}O_{12}$ has the capacity per unit weight which is almost the same as that of lithium titanate. In addition, the negative electrode active materials according to the embodiment can be carried out the lithium-desorbing reaction to proceed at 1.3 to 1.4 V (vs. $Li/Li^+$). Because of this, when the negative electrode active materials according to the embodiment are used in combination with a positive electrode comprising $LiCoO_2$ as a positive electrode active material, the battery voltage would become 2.45 to 2.55 V, thereby making it possible to increase the energy density by about 10%. Due to this range of voltage, it is possible to make the non-aqueous electrolyte battery interchangeable with the existing dry cells or with a 2-serial nickel hydrogen secondary battery, thus making the non-aqueous electrolyte battery very valuable in commercial viewpoint.

$Li_2ZnTi_3O_8$ representing one example of titanium-containing oxide having a crystal structure belonging to $P4_332$ space group according to one embodiment and spinel-type $Li_4Ti_5O_{12}$ having a crystal structure belonging to Fd3-m were subjected to Rietveld analysis to obtain the results as shown in the following Table 1.

TABLE 1

| Compounds | Space group | Tetrahedronic site | Octahedral site | | Oxygen site |
|---|---|---|---|---|---|
| $Li_2ZnTi_3O_8$ | $P4_332$ | 8c (0.5 Ti, 0.5 Zn) | 4b (1.0 Li) | 12d (1.0 Ti) | 8c, 24e (4.0 O) |
| $Li_4Ti_5O_{12}$ | Fd3-m | 8a (1.0 Li) | | 16d (1/3 Li, 5/3 Ti) | 32e (4.0 O) |

It will be recognized from Table 1 that the titanium-containing oxide having a crystal structure belonging to $P4_332$ space group such, for example, as $Li_2ZnTi_3O_8$, representing an active material according to one embodiment differs in the occupation site of elements as compared with the conventional lithium titanium oxide of the conventional spinel-type structure. Because of this difference, the shift of lithium-absorbing/desorbing potential was assumably caused to generate.

Next, a non-aqueous electrolyte battery according to one embodiment will be explained in detail.

The non-aqueous electrolyte battery according to this embodiment is equipped with a positive electrode, with a negative electrode comprising the active material as a negative electrode active material, and with a non-aqueous electrolyte, wherein a separator is interposed between the negative electrode and the positive electrode. All of the negative electrode, the positive electrode, the separator and the non-aqueous electrolyte are placed inside an outer case.

Next, details of each of the positive electrode, the negative electrode, the separator, the non-aqueous electrolyte and the outer case will be discussed in detail.

1) Positive Electrode

The positive electrode comprises a current collector, and a positive electrode active material-containing layer which is formed on one or both surfaces of the current collector and contains an active material, a conductive agent and a binder.

The current collector can be fabricated, for example, from aluminum foil, or from aluminum alloy foil containing an element such as Mg, Ti, Zn, Mn, Fe, Cu, Si.

The active material can be used, for example, oxides or polymers.

Examples of the oxides are manganese dioxide ($MnO_2$) wherein lithium is absorbed therein, iron oxide, copper oxide, nickel oxide, lithium manganese composite oxides (for example, $Li_xMn_2O_4$ or $Li_xMnO_2$), lithium nickel composite oxides (for example, $Li_xNiO_2$), lithium cobalt composite oxides (for example, $Li_xCoO_2$), lithium nickel cobalt composite oxides (for example, $LiNi_{1-y}Co_yO_2$), lithium manganese cobalt composite oxides (for example, $Li_xMn_yCo_{1-y}O_2$), spinel type lithium manganese nickel composite oxides (for example, $Li_xMn_{2-y}Ni_yO_4$), lithium phosphorus oxide of olivine structure (for example, $Li_xFePO_4$, $Li_xFe_{1-y}Mn_yPO_4$, $Li_xCoPO_4$), iron sulfate ($Fe_2(SO_4)_3$), vanadium oxide (for example, $V_2O_5$). Herein x and y are preferably $0<x\leq1$ and $0<y\leq1$.

The polymers can be used, for example, conductive polymer materials such as polyaniline, polypyrrole; and disulfide-based polymer materials. The active material can be also used sulfur (S) or carbon fluoride.

Preferable examples of the active material are those exhibiting a high positive electrode voltage such as lithium manganese composite oxides ($Li_xMn_2O_4$), lithium nickel composite oxides ($Li_xNiO_2$), lithium cobalt composite oxides ($Li_xCoO_2$), lithium nickel cobalt composite oxides ($LiNi_{1-y}Co_yO_2$), spinel type lithium manganese nickel composite oxides ($Li_xMn_{2-y}Ni_yO_4$), lithium manganese cobalt composite oxides ($Li_xMn_yCo_{1-y}O_2$), and lithium iron phosphate ($Li_xFePO_4$). Herein x and y are preferably $0<x\leq1$ and $0<y\leq1$.

More preferable examples of the active material are lithium cobalt composite oxides and lithium manganese composite oxides. Since these composite oxides are high in ionic conductivity, the diffusion of lithium ion in the positive electrode active material can be hardly brought into a rate-determining step in the employment thereof in combination with the negative electrode active material of this embodiment. For this reason, these composite oxides are excellent in compatibility with the negative electrode active materials of this embodiment which comprises the titanium-containing oxide having a crystal structure belonging to the $P4_332$ space group.

The primary particle diameter of the active material is preferably not less than 100 nm and not more than 1 μm in order to facilitate the handling of the active material in the industrial production and to enable the in-solid diffusion of lithium ion to proceed smoothly.

Preferably, the specific surface area of the active material (particles of the active material) may be in the range of not less than 0.1 m$^2$/g and not more than 10 m$^2$/g. When the specific surface area of positive electrode active material is confined to this range, it is possible to sufficiently secure the absorption/desorption site of lithium ion, to facilitate the handling thereof in the industrial production and to secure excellent charge/discharge cycle performance of battery.

Examples of the conductive agent are carbonaceous materials such as acetylene black, carbon black, graphite. Such the conductive agent is effective in enhancing the electronic collecting performance and in suppressing the contact resistance thereof to the current collector.

The binder which is used for bonding the active material with the conductive agent can be used, for example, polytetrafluoroethylene (PTFE), poly(vinylidene fluoride) (PVdF), fluorinated rubber.

The mixing ratio of the active material, the conductive agent and the binder is preferably not less than 80% by weight and not more than 95% by weight of the active material, not less than 3% by weight and not more than 18% by weight of the conductive agent, and not less than 2% by weight and not more than 17% by weight of the binder. When the conductive agent is incorporated at 3% by weight or more, it becomes possible to enable the conductive agent to exhibit the aforementioned effects. When the mixing ratio of the conductive agent is confined to not more than 18% by weight, it is possible to minimize the decomposition of the non-aqueous electrolyte on the surface of conductive agent in the storage even under high temperatures. When the binder is incorporated at a mixing ratio of not less than 2 wt %, it is possible to secure a sufficient strength of the electrode. When the mixing ratio of binder is limited to not more than 17 wt %, it is possible to decrease the mixing ratio of an insulating component in the positive electrode active material-containing layer and to decrease the internal resistance of positive electrode.

In the manufacture of the positive electrode, the active material, the conductive agent and the binder are suspended in a suitable solvent to prepare a slurry. Then, the slurry is coated on the surface of a current collector and dried to form a positive electrode active material-containing layer, which is then pressed to manufacture the positive electrode. Alternatively, a mixture consisting of the active material, the conductive agent and the binder may be formed into pellets for using them to form the positive electrode active material-containing layer.

2) Negative Electrode

The negative electrode comprises a current collector, and a negative electrode active material-containing layer which is carried on one or both surfaces of the current collector.

This negative electrode active material comprises the titanium-containing oxide having a crystal structure belonging to the P4$_3$32 space group.

The active material preferably comprises titanium-containing oxide represented by the general formula Li$_{4x+y}$M$_{6-6x}$Ti$_{3+2x}$O$_{12}$, wherein M is at least one element selected from elements of Groups 2 to 15; x is 0.5<x<0.95; and y is 0≦y≦6.

In the titanium-containing oxide represented by this general formula, M is preferably at least one element selected from the group consisting of Mg, Ca, Sr, Ba, Fe, Co, Ni, Cu and Zn. Among them, Mg, Ca, Sr, Ba and Zn are especially preferable since these elements are effective in suppressing the collapsing of the crystal structure of titanium-containing oxide on the occasion of absorbing and desorbing lithium, thereby exhibiting excellent crystal stability. As a result, it is possible to obtain a non-aqueous electrolyte battery which is excellent in charge/discharge cycle characteristics. Especially preferable examples of this M element are Mg, Ca and Zn. When these elements are used, the lithium-absorbing/desorbing potential can be decreased, thus making it possible to obtain a non-aqueous electrolyte battery of higher energy density.

In the titanium-containing oxide represented by the general formula, x is preferably 0.65≦x≦0.85 in order to make it possible to obtain a crystal structure which is minimal in distortion and to improve the stability of crystal structure, thus realizing excellent charge/discharge cycle characteristics. More preferably, the x in the general formula is 0.70≦x≦0.80.

In the aforementioned viewpoints, preferable titanium-containing oxide is at least one oxide selected from the group consisting of Li$_{2+z}$MgTi$_3$O$_8$, Li$_{2+z}$CaTi$_3$O$_8$, Li$_{2+z}$BaTi$_3$O$_8$, Li$_{2+z}$FeTi$_3$O$_8$, Li$_{2+z}$CoTi$_3$O$_8$, Li$_{2+z}$NiTi$_3$O$_8$, Li$_{2+z}$CuTi$_3$O$_8$, Li$_{2+z}$ZnTi$_3$O$_8$ and Li$_{2+z}$SrTi$_3$O$_8$ (wherein z is 0≦z≦4).

With respect to the mole ratio of oxygen, it is formally confined to 12 as represented by the general formula Li$_{4x-y}$M$_{6-6x}$Ti$_{3+2x}$O$_{12}$, this value possibly varying depending on the influence of oxygen nonstoichiometry; further, the titanium-containing oxide may contain a small amount of unavoidable elements contained in raw materials.

The active material may be constituted by a single titanium-containing oxide having a crystal structure belonging to the P4$_3$32 space group or by a mixture of two or more the titanium-containing oxides. It is also possible to co-use other active materials which are capable of absorbing/desorbing lithium. Examples of such other active materials are carbonaceous materials, alloys, oxides, nitrides, carbides.

The average particle diameter of the active material is preferably not more than 10 μm, more preferably not more than 1 μm. However, if this average particle diameter is too small, the distribution of the non-aqueous electrolyte may be deviated to the negative electrode side, thereby inviting the exhaustion of the electrolyte at the positive electrode. Therefore, the lower limit of the average particle diameter of the negative electrode active material should preferably be set to 0.001 μm. Most preferably, the average particle diameter of the active material should be confined to not less than 0.1 μm and not more than 1 μm.

Preferably, the active material should be formulated so as to have an average particle diameter of not more than 1 μm and a specific surface area (as measured by means of BET method based on N$_2$ adsorption) of not less than 5 m$^2$/g and not more than 100 m$^2$/g, more preferably not less than 5 m$^2$/g and not more than 50 m$^2$/g. The active materials satisfying these conditions are capable of enhancing the impregnation of non-aqueous electrolyte.

The porosity of the negative electrode active material-containing layer is preferably not less than 20% and not more than 50%. The negative electrode comprising such a negative electrode active material-containing layer is excellent in affinity with the non-aqueous electrolyte and makes it possible to increase the density. A more preferable range of the porosity of the negative electrode active material-containing layer is not less than 25% not more than 40%.

The density of the negative electrode active material-containing layer should preferably be not less than 2.0 g/cc. If the density of the negative electrode active material-containing layer is less than 2.0 g/cc, it may become difficult to obtain the negative electrode active material-containing layer having the aforementioned range of porosity. A more preferable range of the density of the negative electrode active material-containing layer is not less than 2.0 g/cc and not more than 3.2 g/cc.

The current collector is preferably formed of aluminum foil or aluminum alloy foil. The current collector is also preferably configured to have an average grain diameter of not more than 50 μm. When the current collector has such features, it makes possible to remarkably increase the mechanical strength thereof. As a result, it is possible to enhance the density of the negative electrode by applying a high press pressure on the occasion of manufacturing the negative electrode, thereby enabling to increase the battery capacity. Further, since the current collector having such features can be prevented from being degraded by the dissolution/corrosion thereof on the occasion of over-discharging in high-temperature environments (40° C. or more), any rise in impedance at the negative electrode. Additionally, it is also possible to enhance the output characteristics, quick charging and charge/discharge cycle characteristics of battery. The average crystal grain diameter of the current collector should more preferably be not more than 30 μm, most preferably not more than 5 μm.

The average grain diameter of crystal grains of the current collector can be determined by the following method. That is, the texture of the surface of current collector is observed by making use of an optical microscope to count the number (n) of crystal grains existing in an area of 1 mm×1 mm. By making use of this number (n), an average crystal grain area S is determined according to the expression $S=1\times 10^6/n$ [μm$^2$]. From the value of S thus obtained, an average grain diameter d [μm] of crystal grains is calculated according to the following formula (1).

$$D=2(S/\pi)^{1/2} \qquad (1)$$

The crystal grain diameter of aluminum foil or aluminum alloy foil having an average grain diameter of 50 μm or less will be complicatedly influenced by many factors such as the composition of material, impurities, working conditions, heat treatment history and heating conditions such as annealing, so that the crystal grain diameter should be adjusted by suitably combining the aforementioned various factors in the manufacturing process of the current collector.

The thickness of aluminum foil or aluminum alloy foil is preferably 20 μm or less, more preferably 1.5 μm or less. With respect to the purity of aluminum foil, it should preferably be 99% or more. The aluminum alloys may preferably be selected from alloys containing magnesium, zinc, silicon. If aluminum alloys contains a transition metal such as iron, copper, nickel, chromium, the quantity thereof is preferably not more than 1% by weight.

The negative electrode active material-containing layer may contain a conductive agent. This conductive agent can be used, for example, carbonaceous materials, metallic powder such as aluminum powder, conductive ceramics such as TiO. Examples of carbonaceous materials are acetylene black, carbon black, coke, carbon fiber, graphite. More preferable examples of carbonaceous material is coke that can be obtained through a heat treatment at the range 800 to 2000° C. and having an average particle diameter of not more than 10 μm, graphite, TiO powder, carbon fiber having an average fibrous diameter of 1 μm or less. These carbonaceous materials should preferably be selected from those having a BET specific surface area of 10 m$^2$/g or more as measured by way of N$_2$ adsorption.

The negative electrode active material-containing layer may contain a binder. Examples of the binder are polytetrafluoroethylene (PTFE), poly(vinylidene fluoride) (PVdF), fluorinated rubber, styrene butadiene rubber, core shell binder.

The mixing ratio of the active material, the conductive agent and the binder is preferably not less than 70% by weight and not more than 96% by weight of the active material, not less than 2% by weight and not more than 28% by weight of the conductive agent, and not less than 2% by weight and not more than 28% by weight of the binder. When the conductive agent is incorporated at less than 2% by weight, the electronic collecting performance of the negative electrode active material-containing layer may be degraded, thus degrading the large-current characteristics of the non-aqueous electrolyte battery. When the mixing ratio of the binder is less than 2% by weight, the bonding property of the current collector to the negative electrode active material-containing layer would be degraded, thus degrading the charge/discharge cycle characteristics of the battery. On the other hand, when the quantities of the conductive agent and of the binder are respectively limited to not more than 28 wt %, it is possible to obtain a non-aqueous electrolyte battery of high capacity.

This negative electrode can be manufactured as follows for example. First of all, an active material, a conductive agent and a binder are incorporated into a little amount of solvent to obtain a mixture containing a large ratio of solid matters (a total ratio of the active material, the conductive agent and the binder to the solvent). The resultant mixture is kneaded in a planetary mixer during applying a strong shearing force to the mixture so as to uniformly disperse the solid matters. On this occasion, if the ratio of solid matters is not sufficiently high, this shearing force would become too small to sufficiently pulverize the aggregated negative electrode active material, thus making it impossible to uniformly disperse the solid matters. This step would become more important as the particle diameter of the active material to be treated is smaller. Therefore, the handling of this step becomes especially important as an average particle diameter of the active material is 1 μm or less. After the kneading of the mixture is sufficiently executed under the condition where the ratio of solid matters is sufficiently high, the ratio of solid matters is gradually decreased by gradually adding the solvent, thereby adjusting the viscosity of the mixture to such an extent that the mixture is applicable as a slurry by way of coating. The slurry that has been adjusted in viscosity so as to make it applicable by way of coating is further sufficiently mixed in a beads mill using ceramic balls as a medium. During this milling process, the edges of active material particle are scraped, thus making the surface of active material particle smoother. The ceramic balls can be used various materials such as glass, alumina, mullite, silicon nitride. Especially, in terms of abrasion resistance and impact resistance, it is preferable to use zirconia balls. The diameter of the balls is preferably not less than 0.5 mm and not more than 5 mm. If the diameter of the balls is less than 0.5 mm, the impact force to be derived from the balls would become too small. On the other hand, if the diameter of the balls exceeds 5 mm, the contacting area among the balls becomes smaller, thus degrading the kneading capability of the balls. More preferable diameter of the balls is not less than 1 mm and not more than 3 mm.

The slurry thus obtained is then coated on the current collector and dried to form a negative electrode active material-containing layer. The resultant body is then subjected to rolling by making use of a roll press machine, thereby manufacturing the negative electrode. The temperature of rolls on the occasion of rolling by means of the roll press machine should preferably be set to not less than 40° C. and not more than 180° C. If the roll temperature is lower than 40° C., the conductive agent which is smaller in specific gravity than that of the active material may be caused to rise up to the surface of negative electrode active material-containing layer, thereby making it impossible to obtain a negative electrode of high density having suitable fine pores, possibly resulting in the degradation in impregnation of non-aqueous electrolyte. Additionally, the performance of the battery will be also degraded. On the other hand, if the roll temperature is higher than 180° C., the crystallization of the binder may be promoted to degrade the flexibility of the negative electrode active material-containing layer and, because of this, the negative electrode active material-containing layer may be caused to easily break or peel off. As a result, the productivity of the battery may be decreased and the performance of the battery such as the output characteristics and charge/discharge cycle characteristics of the battery may be degraded. A more preferable range of roll temperature is not less than 90° C. and not more than 150° C.

According to the aforementioned method, it is possible to realize the high-density filling of the active material through a series of processes including the coating of a slurry containing active material particles having smoothed surface on the surface of current collector, the drying of the coated slurry and the rolling of dried slurry. Further, since the fine pore size distribution of the active material particles can be shifted to the smaller pore size side, it is possible to obtain a negative electrode provided with a negative electrode active material-containing layer having the aforementioned range of porosity (20 to 50%).

3) Separator

Examples of the separator are a porous film formed of polyethylene, polypropylene, cellulose or polyvinylidene fluoride (PVdF); and unwoven fabrics formed of synthetic resin. Among them, a porous film formed of polyethylene or polypropylene is preferable, since it is capable of being fused at a predetermined temperature, thereby making it possible to cut off current. Thus, this porous film is preferable in viewpoints of enhancing the safety.

4) Non-Aqueous Electrolyte

Examples of the non-aqueous electrolyte are a liquid non-aqueous electrolyte which can be prepared by dissolving an electrolyte in an organic solvent, and a gel-like non-aqueous electrolyte which can be obtained by making a liquid electrolyte and a macromolecular material into a composite configuration.

The liquid non-aqueous electrolyte can be prepared by dissolving an electrolyte in an organic solvent at a concentration of not less than 0.5 mol/L and not more than 2.5 mol/L.

Examples of the electrolyte are lithium salts such as lithium perchlorate ($LiClO_4$), lithium phosphate hexafluoride ($LiPF_6$), lithium borate tetrafluoride ($LiBF_4$), lithium arsenate hexafluoride ($LiAsF_6$), lithium trifluorometasulfonate ($LiCF_3SO_3$), bistrifluoromethyl sulfonyliminolithium [$LiN(CF_3SO_2)_2$], and a mixture thereof. Among them, $LiPF_6$ is most preferable electrolyte, because it can be hardly oxidized even at high electrical potentials.

Examples of the organic solvent are cyclic carbonates such as propylene carbonate (PC), ethylene carbonate (EC) and vinylene carbonate; linear carbonates such as diethylene carbonate (DEC), dimethylene carbonate (DMC) and methylethyl carbonate (MEC); cyclic ethers such as tetrahydrofuran (THF), 2methyl tetrahydrofuran (2Me THF) and dioxorane (DOX); linear ethers such as dimethoxy ethane (DME) and diethoxy ethane (DEE); γ-butyrolactone (GBL); acetonitrile (AN); sulforane (SL). These solvents can be used singly or in combination of two or more.

Examples of the macromolecular materials are poly(vinylidene fluoride) (PVdF), polyacrylonitrile (PAN), polyethylene oxide (PEO), etc.

A preferable example of the organic solvent is a mixed solvent comprising at least two kinds of organic solvent selected from the group consisting of propylene carbonate (PC), ethylene carbonate (EC) and γ-butyrolactone (GBL). A more preferable organic solvent is γ-butyrolactone (GBL).

The negative electrode active material is capable of absorbing and desorbing lithium ion at an electrical potential zone in the vicinity of 1.5 V and 1.3 to 1.4 V (vs. Li/Li$^+$). However, the reducing decomposition of non-aqueous electrolyte is unlikely to take place in this electrical potential zone, so that it is difficult to deposit a film of the reduction product of non-aqueous electrolyte on the surface of negative electrode active material. Because of this, when the battery is preserved under a lithium-absorbed condition, i.e., a charged condition, the lithium ion that has been absorbed in the active material is permitted to gradually diffuse into the electrolyte, thereby permitting self-discharging to take place. This self-discharging would become more prominent as the storage environments of battery are brought into higher temperatures.

Among the aforementioned organic solvents, γ-butyrolactone can be more easily reduced as compared with linear carbonate or with cyclic carbonate. More specifically, when the easiness of reduction is compared among these organic solvents, it can be represented by the order of: γ-butyrolactone>>>ethylene carbonate>propylene carbonate>>dimethyl carbonate>methylethyl carbonate>diethyl carbonate. For this reason, when γ-butyrolactone is added to an electrolyte, it becomes possible to deposit a film of excellent quality on the surface of negative electrode active material. As a result, it is possible to suppress the self-discharging of battery and to enhance the high-temperature storage characteristics of non-aqueous electrolyte battery.

With respect to the mixed solvent comprising at least two organic solvent selected from the group consisting of propylene carbonate (PC), ethylene carbonate (EC) and γ-butyrolactone (GBL) as well as with respect to especially the mixed solvent containing γ-butyrolactone also, it is possible, in the same manner as described above, to suppress the self-discharging of battery and to enhance the high-temperature storage characteristics of non-aqueous electrolyte battery.

When the mixing ratio of the γ-butyrolactone in the organic solvent is not less than 40% by volume and not more than 95% by volume, it is possible to form a protective film of excellent quality on the surface of the negative electrode active material.

5) Outer Case

The outer case is formed from a laminate film having a thickness of not more than 0.5 mm or formed of a metallic vessel having a wall thickness of not more than 1.0 mm. More preferably, the wall thickness of the metallic vessel is not more than 0.5 mm.

The configuration of the outer case may be a flat type (thin type), a square type, a cylindrical type, a coin type or a button type. This outer case may be variously designed depending on the size of battery. For example, it can be designed as an outer case for a small battery which can be mounted on mobile electronic instruments, or as an outer case for a large battery which can be mounted on a two- or four-wheeled vehicle.

The laminate film can be used a multi-layer film having a metal layer interposed between resin films. The metal layer is preferably formed of aluminum foil or aluminum alloy foil for reducing the weight thereof. The resin layer can be used, for example, polymer materials such as polypropylene (PP), polyethylene (PE), nylon, polyethylene terephthalate (PET). The laminate film can be molded into any desired configuration of outer case through sealing using thermal fuse-bonding.

The metal vessel can be manufactured from aluminum or aluminum alloys. The aluminum alloys is preferably selected from alloys containing magnesium, zinc, silicon. If aluminum alloys containing a transition metal such as iron, copper, nickel, chromium, are to be employed, the quantity thereof is preferably not more than 100 ppm.

Figure 2:
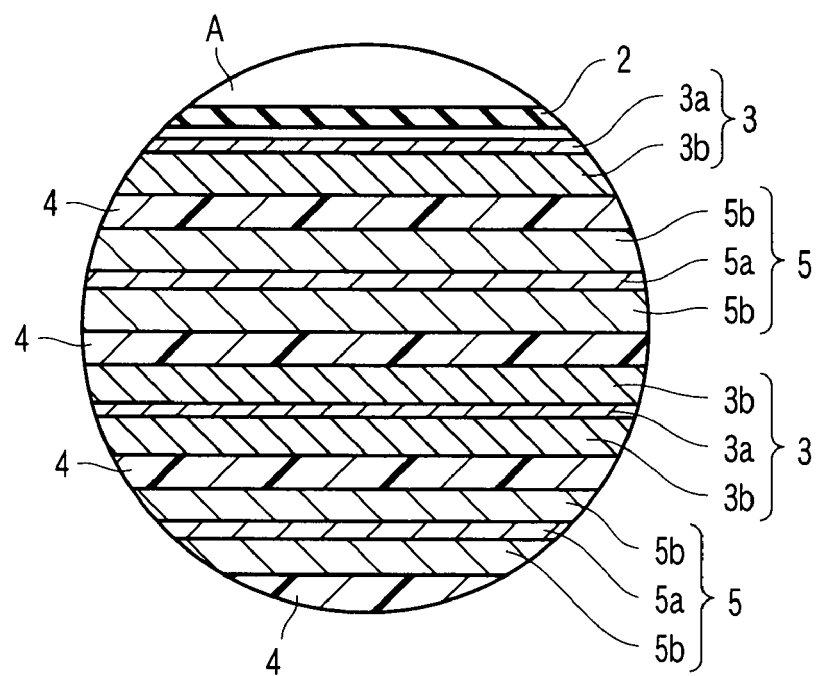
FIG. 2 is an enlarged cross-sectional view illustrating the portion A of FIG. 1.

Next, the non-aqueous electrolyte battery (a flat type non-aqueous electrolyte battery where the outer case of formed of a laminate film) according to one embodiment will be explained in detail with reference to FIGS. 1 and 2. FIG. 1 is a cross-sectional view schematically illustrating a thin type non-aqueous electrolyte battery; and FIG. 2 is an enlarged cross-sectional view illustrating the portion A of FIG. 1. By the way, each of FIGS. 1 and 2 depicts a schematic view for assisting the understanding of the present invention and the explanation thereof so that the configuration, dimension and dimensional ratio of some of the constituent components may differ from those of the actual apparatus. However, specific geometry of these components can be optionally modified with reference to the following descriptions and the conventional technology.

A flattened wound electrode group 1 is housed in a bag-like outer case 2 which is formed from a laminate film comprising a couple of resin films with a metal layer interposed between them. The flattened wound electrode group 1 is constructed by spirally wounding and press-molding a laminate comprising mentioning from outside, a negative electrode 3, a separator 4, a positive electrode 5 and a separator 4. As shown in FIG. 2, the negative electrode 3 constituting the outermost husk is constructed such that a negative electrode active material-containing layer 3b containing, as an active material, titanium-containing oxide having a crystal structure belonging to the $P4_332$ space group are laminated on an inner surface of a current collector 3a. Other negative electrodes 3 are respectively constructed such that the aforementioned negative electrode active material-containing layers 3b are formed on the opposite surfaces of the current collector 3a. The positive electrode 5 is constructed such that a positive electrode active material-containing layer 5b is formed on the opposite surfaces of a current collector 5a.

In the vicinity of the outer circumferential edge portion of the electrode group 1, a negative electrode terminal 6 is electrically connected to the current collector 3a of the negative electrode 3 constituting the outermost husk and a positive electrode terminal 7 is electrically connected to the current collector 5a of the inner positive electrode 5. These negative electrode terminal 6 and positive electrode terminal 7 are led out through an opening of the bag-like outer case 2. For example, a liquid non-aqueous electrolyte is poured into the bag-like outer case 2 through the opening of the outer case 2. The opening of the bag-like outer case 2 is heat-sealed with the negative electrode terminal 6 and positive electrode terminal 7 being positioned inside, thereby completely sealing the electrode group 1 and the liquid non-aqueous electrolyte.

The negative electrode terminal can be made of materials which are conductive and electrically stable under the condition where the electrical potential of metal lithium ion is not less than 1.0 V and not more than 3.0 V. Examples of the material for the negative electrode terminal are aluminum or aluminum alloy containing Mg, Ti, Zn, Mn, Fe, Cu, Si. Preferably, the negative electrode terminal should be formed of the same material as that of the current collector of negative electrode in order to minimize the contact resistance thereof to the current collector.

The positive electrode terminal can be made of materials which are electrically conductive and electrically stable under the condition where the electrical potential of metal lithium ion is not less than 3.0 V and not more than 4.25 V. Examples of the material for the positive electrode terminal are aluminum or aluminum alloys containing any of elements such as Mg, Ti, Zn, Mn, Fe, Cu, Si. Preferably, the positive electrode terminal should be formed of the same material as that of the current collector of positive electrode in order to minimize the contact resistance thereof to the current collector.

The present invention will be further explained in detail with reference to specific examples which are not intended to limit the scope of the present invention.

SYNTHESIS EXAMPLE 1

$Li_2CO_3$ powder, ZnO powder and anatase-type $TiO_2$ powder having an average particle diameter of 1 μm were mixed together in ethanol employed as a solvent such that the molar ratio of Li:Zn:Ti is 2:1:3 and then dried to obtain a sintering precursor. This precursor was heat-treated for two hours in air atmosphere at a temperature of 650° C. Then, the resultant material was slightly pulverized in an agate mortar. Subsequently, the resultant pulverized material was further heat-treated for 12 hours at a temperature of 850° C. The powder thus obtained was again pulverized in an agate mortar to obtain a negative electrode active material. This negative electrode active material was found as having an average particle diameter of 0.86 μm and a BET specific surface area of 10.8 $m^2/g$.

Figure 3:
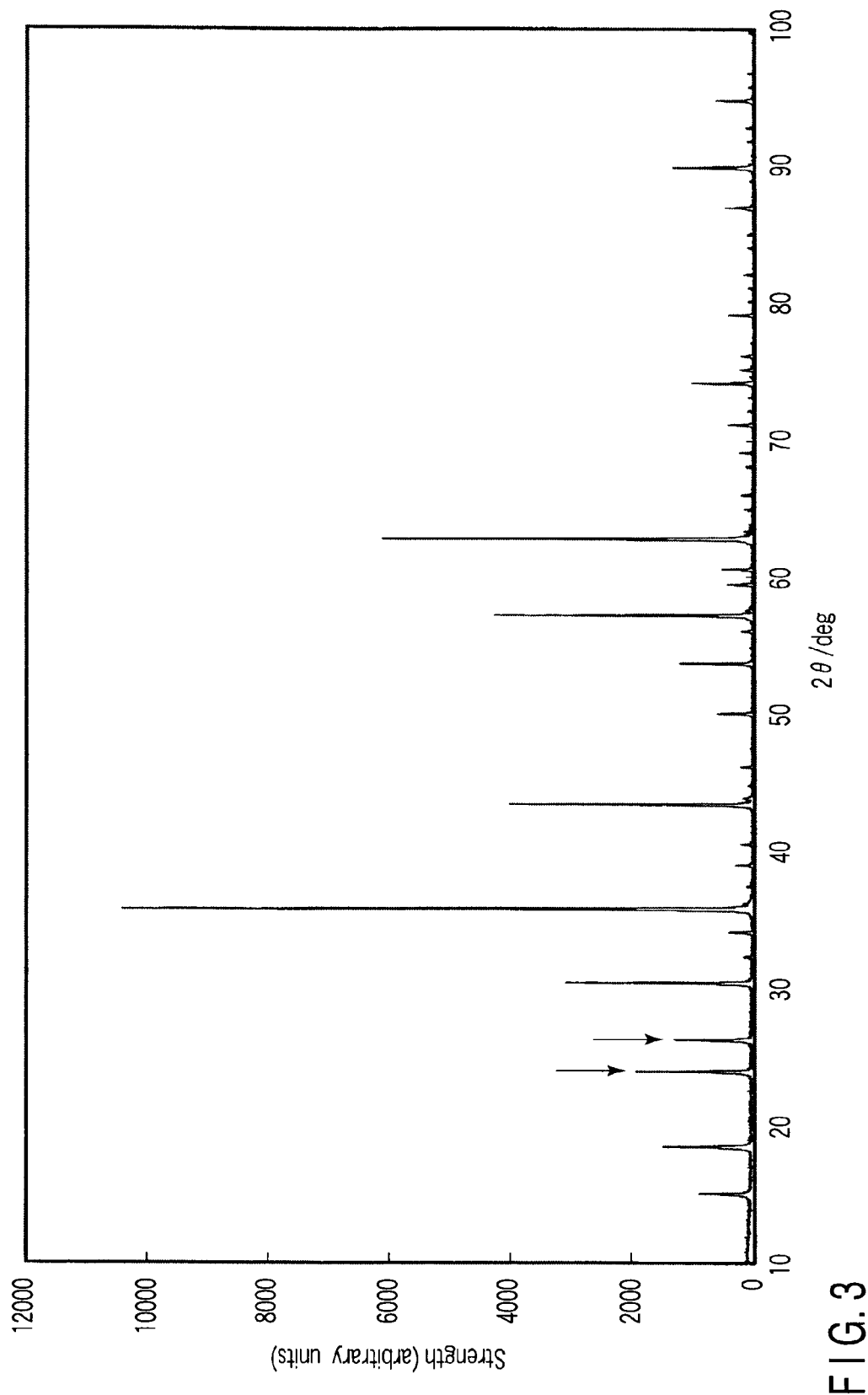
FIG. 3 is a graph showing the XRD pattern of Li$_2$ZnTi$_3$O$_8$.

The negative electrode active material thus obtained was then subjected to powder X-ray diffractometry to identify the space group (crystal structure) and composition thereof. As a result, as indicated by the XRD pattern of FIG. 3, it was possible to confirm that the negative electrode active material was formed of $Li_2ZnTi_3O_8$ (general formula $Li_{4x}M_{6-6x}Ti_{3+2x}O_{12}$, wherein M=Zn and x=0.75) having a crystal structure belonging to the $P4_332$ space group. The crystal structure where the space group thereof belongs to $P4_332$ can be identified by a characteristic peak appearing in the vicinity of about 25 to 27° as indicated by the arrow in FIG. 3. Incidentally, the composition $Li_2ZnTi_3O_8$ can be obtained by dividing the atomic ratio of each of the elements by 1.5 in the structural formula $Li_3Zn_{1.5}Ti_{4.5}O_{12}$, which can be obtained by substituting Zn for M, 0.75 for x and zero for y in the aforementioned general formula.

SYNTHESIS EXAMPLES 2 TO 8

Various kinds of negative electrode active materials were synthesized by repeating the same procedures as described in Synthesis Example 1 except that the mixing ratio of the constituent components of sintering precursor was changed as follows. Namely, based on the general formula of $Li_{4x}M_{6-6x}Ti_{3+2x}O_{12}$ wherein x was set to zero in the case of Synthesis Example 2; 0.2 in the case of Synthesis Example 3; 0.50 in the case of Synthesis Example 4; 0.65 in the case of Synthesis Example 5; 0.85 in the case of Synthesis Example 6; 0.95 in the case of Synthesis Example 7; and 1.00 in the case of Synthesis Example 8. All of the negative electrode active materials thus obtained were found as having an average particle diameter falling within the range 0.8 to 0.9 μm and a BET specific surface area falling within the range 10 to 11 $m^2/g$.

Figure 4:
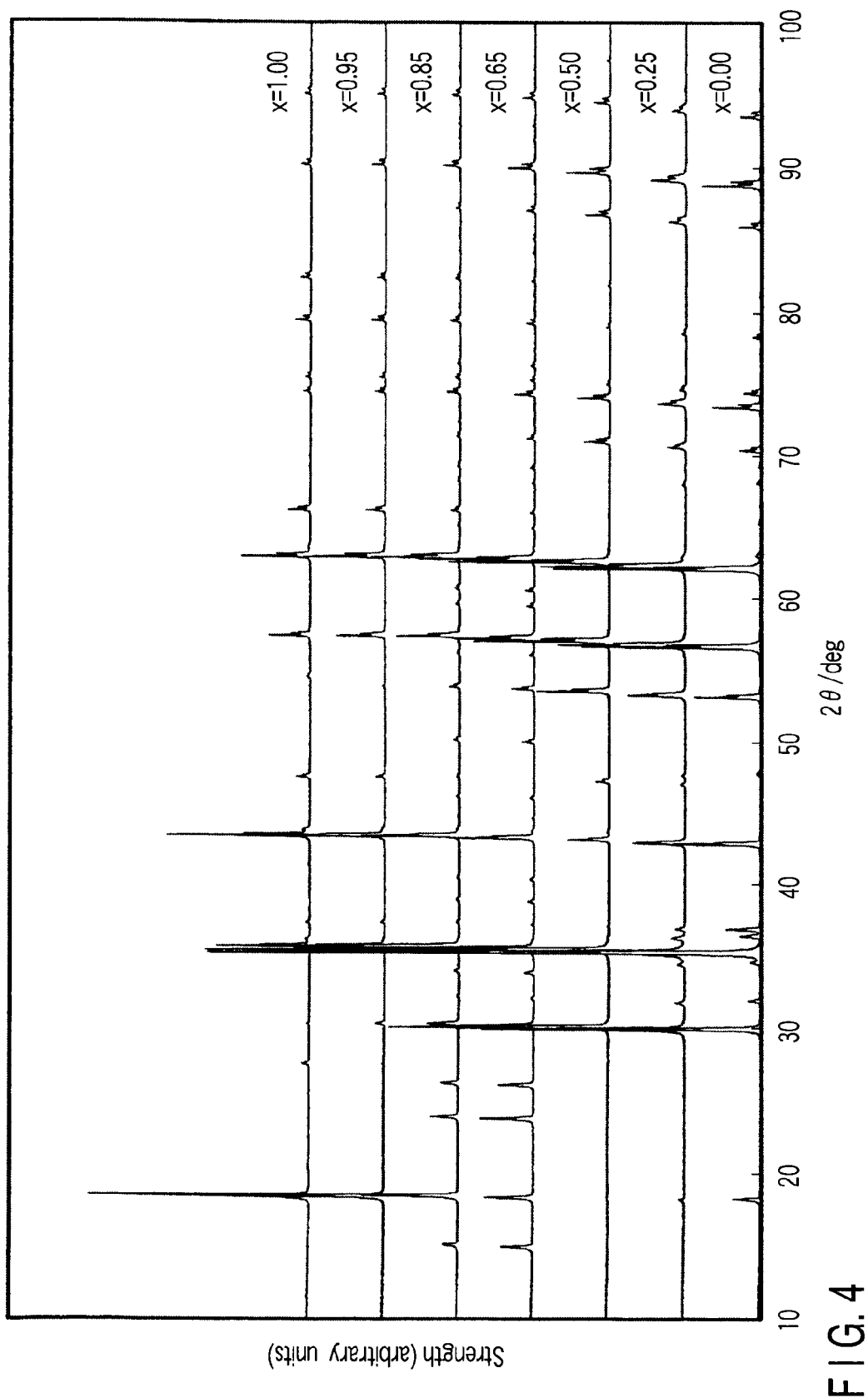
FIG. 4 is a graph showing the XRD pattern of a material represented by Li$_{4x}$M$_{6-6x}$Ti$_{3+2x}$O$_{12}$ (x=0 to 1)

The negative electrode active materials thus synthesized were then subjected to powder X-ray diffractometry to identify the space group (crystal structure). As a result, as indicated by the XRD pattern of FIG. 4, it was possible to confirm that only the negative electrode active materials of Synthesis Examples of 5 (where x=0.65) and 6 (where x=0.85) were found as having a crystal structure belonging to the $P4_332$ space group (wherein a characteristic peak was appeared in the vicinity of about 25 to 27°).

Figure 5:
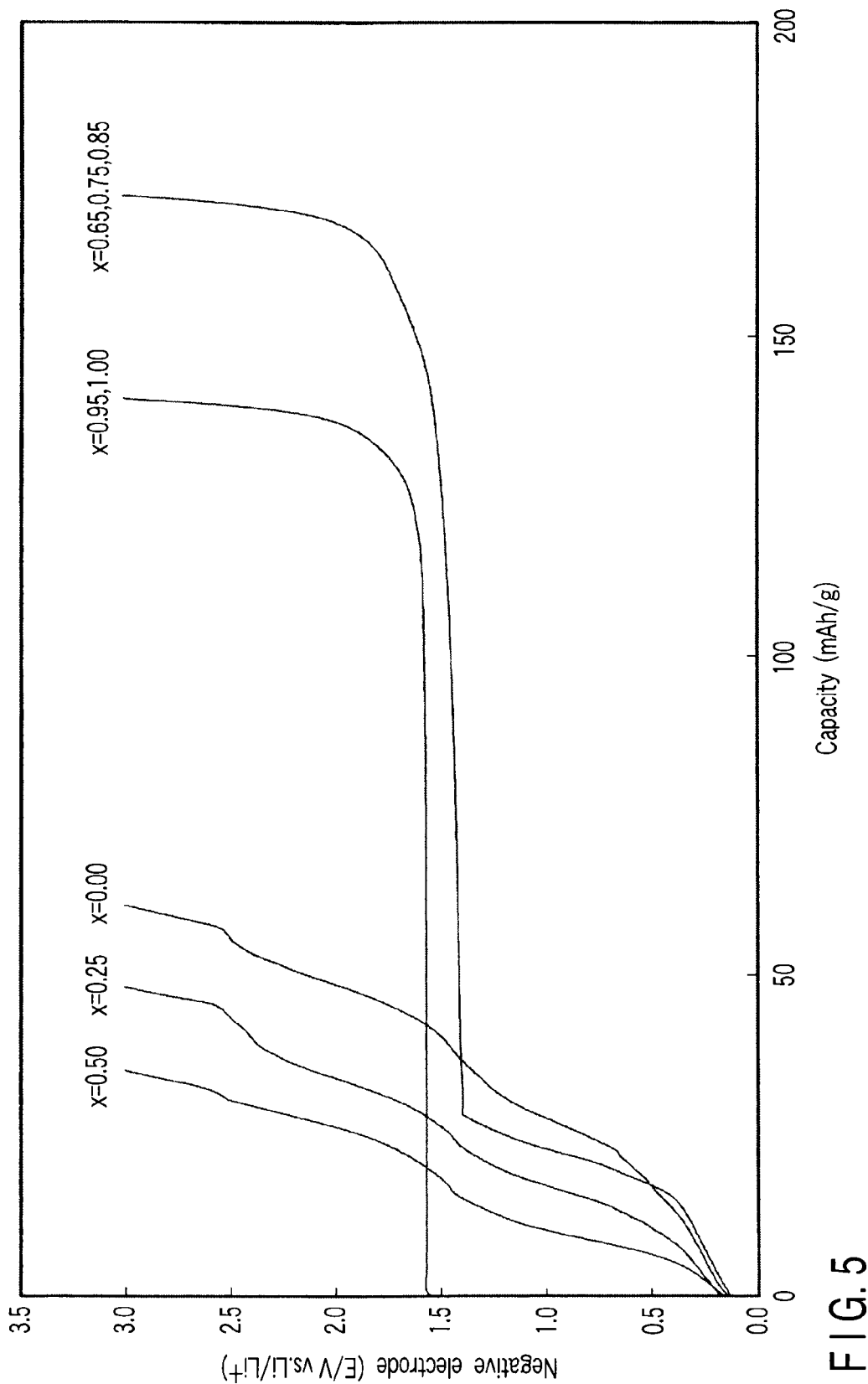
FIG. 5 is a graph showing discharge curves of the negative electrode active materials (lithium counter electrode) of Examples 1 to 3 and Comparative Examples 1 to 5.

Further, these negative electrode active materials were subjected to the single-electrode assessment of counter-electrode lithium to determine a discharge curve representing the relationship between the capacity and the negative electrode potential. The results obtained are shown in FIG. 5. As shown in FIG. 5, it was possible to confirm that the active materials wherein x in $Li_{4x}M_{6-6x}Ti_{3+2x}O_{12}$ (the space group belonging to Fd3-m) was 0, 0.25 or 0.50 (Synthesis Examples 2 to 4) were small in capacity (quantity of electricity).

SYNTHESIS EXAMPLES 9 TO 14

Various kinds of negative electrode active materials represented by the general formula $Li_{4x}M_{6-6x}Ti_{3+2x}O_{12}$ (wherein M=Mg, Ca, Fe, Co, Ni or Cu; and x=0.75) were synthesized by repeating the same procedures as described in Synthesis Example 1 except that Mg, Ca, Fe, Co, Ni and Cu were respectively substituted for Zn representing the M element in the sintering precursor. All of the negative electrode active materials thus obtained were found as having an average particle diameter falling within the range 0.8 to 0.9 μm and a BET specific surface area falling within the range 10 to 11 $m^2/g$.

The negative electrode active materials thus synthesized were then subjected to powder X-ray diffractometry to identify the space group (crystal structure). As a result, all of the negative electrode active materials of Synthesis Examples 9 to 14 were found as having a crystal structure belonging to the $P4_332$ space group.

EXAMPLE 1

<Manufacture of Positive Electrode>

First of all, 90 wt % of lithium cobalt oxide ($LiCoO_2$) powder as a positive electrode active material, 3 wt % of acetylene black, 3 wt % of graphite and 4 wt % of poly(vinylidene fluoride) (PVdF) were added to and mixed with N-methylpyrrolidone (NMP) to prepare a slurry. This slurry was then coated on the opposite surfaces of a current collector made of aluminum foil having a thickness of 15 μm and then dried and pressed to manufacture a positive electrode having a positive electrode active material-containing layer of 3.3 $g/cm^3$ in density.

<Manufacture of Negative Electrode>

85 parts by weight of the negative electrode active material obtained in Synthesis Example 1 and represented by $Li_2ZnTi_3O_8$ belonging to the $P4_332$ space group, 10 parts by weight of graphite powder having a specific surface area of 10 $m^2/g$ (as measured by means of BET method), and 5 parts by weight of poly(vinylidene fluoride) (PVdF) were added to and mixed with N-methylpyrrolidone (NMP) to prepare a slurry. This slurry was then coated on the opposite surfaces of a current collector made of aluminum foil having a thickness of 15 μm and then dried and pressed to manufacture a negative electrode having a negative electrode active material-containing layer of 2.4 $g/cm^3$ in density.

<Preparation of Liquid Non-Aqueous Electrolyte>

Lithium borate tetrafluoride ($LiBF_4$) was dissolved as an electrolyte in a mixed solvent of ethylene carbonate (EC) and γ-butyrolactone (GBL) (volume ratio between EC and GBL is 25:75) at a ratio of 1.5 mol/L to prepare a liquid non-aqueous electrolyte.

<Assembling of Battery>

The above-described positive electrode, a separator made of polyethylene porous film having a thickness of 25 μm, the above-described negative electrode and the aforementioned separator were successively laminated and then spirally wound to obtain a wound body. Then, this wound body was hot-pressed at a temperature of 90° C. to manufacture a flat electrode group having a width of 30 mm and a thickness of 3.0 mm. On the other hand, a pack made from a laminate film consisting of a polypropylene layer (0.1 mm in thickness)/an aluminum foil (40 μm in thickness)/a polypropylene layer (0.1 mm in thickness) and having a thickness of 0.1 mm was prepared. Then, the above-described electrode group was housed in this pack and then subjected to vacuum-drying for 24 hours at a temperature of 80° C. Then, the above-described liquid non-aqueous electrolyte was poured into the laminate film-made pack housing the electrode group and the opening of the pack was heat-sealed to completely close the pack, thereby assembling a non-aqueous electrolyte battery having the structure as shown in FIG. 1 and having a width of 35 mm, a thickness of 3.2 mm and a height of 65 mm.

COMPARATIVE EXAMPLES 1 TO 5

Various non-aqueous electrolyte batteries were manufactured by repeating the same procedures as described in Example 1 excepting that the negative electrode active materials obtained in the Synthesis Examples 2, 3, 4, 7 and 8 were employed substituting for the negative electrode active material of Example 1.

EXAMPLES 2 AND 3

Non-aqueous electrolyte batteries were manufactured by repeating the same procedures as described in Example 1 excepting that the negative electrode active materials obtained in the Synthesis Examples 5 and 6 were employed substituting for the negative electrode active material of Example 1.

EXAMPLES 4 to 8

Various non-aqueous electrolyte batteries were manufactured by repeating the same procedures as described in Example 1 excepting that the negative electrode active materials obtained in the Synthesis Examples 9 to 13 were employed substituting for the negative electrode active material of Example 1.

Among the non-aqueous electrolyte batteries obtained in Examples 1 to 8 and in Comparative Examples 1 to 5, the non-aqueous electrolyte batteries of Examples 1 to 8 and of Comparative Examples 4 and 5 where the quantity of electricity thereof was larger than 60 mA h/g were subjected to the initial charging/discharging at a current of 0.2 C to thereby measure the average operating voltage of batteries and calculate the energy density of battery from the average operating voltage thus obtained. Then, the batteries that have been confirmed of the capacity thereof were subjected to 1 C/1 C charge/discharge cycle by repeating this cycle 50 times. Then, the battery capacity after the 50$^{th}$ cycle was compared with the initial battery capacity to calculate the capacity retention rate of battery.

The results are shown in the following Tables 2 and 3. In these Tables 2 and 3, the compositions of negative electrode active materials, M, x and space group of $Li_{4x}M_{6-6x}Ti_{3+2x}O_{12}$, and quantity of electricity are also described.

TABLE 2

| | Negative electrode active materials obtained from Synthesis Examples 1 to 8 | | | | Electrical quantity | Average operating | Energy density | Capacity retention |
|---|---|---|---|---|---|---|---|---|
| | Composition | M | x | Space group | (mAh/g) | voltage (V) | (Wh/L) | rate (%) |
| Example 1 | $Li_{4x}M_{6-6x}Ti_{3+2x}O_{12}$ ($Li_2MTi_3O_8$) | Zn | 0.75 | P4$_3$32 | 175 | 2.45 | 135 | 95 |
| Comparative Example 1 | $Li_{4x}M_{6-6x}Ti_{3+2x}O_{12}$ | Zn | 0 | Fd3-m | 60 | — | — | — |
| Comparative Example 2 | $Li_{4x}M_{6-6x}Ti_{3+2x}O_{12}$ | Zn | 0.25 | Fd3-m | 45 | — | — | — |
| Comparative Example 3 | $Li_{4x}M_{6-6x}Ti_{3+2x}O_{12}$ | Zn | 0.5 | Fd3-m | 30 | — | — | — |
| Example 2 | $Li_{4x}M_{6-6x}Ti_{3+2x}O_{12}$ | Zn | 0.65 | P4$_3$32 | 175 | 2.45 | 135 | 90 |
| Example 3 | $Li_{4x}M_{6-6x}Ti_{3+2x}O_{12}$ | Zn | 0.85 | P4$_3$32 | 175 | 2.45 | 135 | 92 |
| Comparative Example 4 | $Li_{4x}M_{6-6x}Ti_{3+2x}O_{12}$ | Zn | 0.95 | Fd3-m | 140 | 2.30 | 100 | 95 |
| Comparative Example 5 | $Li_{4x}M_{6-6x}Ti_{3+2x}O_{12}$ ($Li_4Ti_5O_{12}$) | — | 1 | Fd3-m | 140 | 2.30 | 100 | 95 |

TABLE 3

| | Negative electrode active materials obtained from Synthesis Examples 9 to 14 | | | | Electrical quantity | Average operating | Energy density | Capacity retention |
|---|---|---|---|---|---|---|---|---|
| | Composition | M | x | Space group | (mAh/g) | voltage (V) | (Wh/L) | rate (%) |
| Example 4 | $Li_{4x}M_{6-6x}Ti_{3+2x}O_{12}$ ($Li_2MTi_3O_8$) | Mg | 0.75 | P4$_3$32 | 185 | 2.44 | 140 | 95 |
| Example 5 | $Li_{4x}M_{6-6x}Ti_{3+2x}O_{12}$ ($Li_2MTi_3O_8$) | Ca | 0.75 | P4$_3$32 | 180 | 2.44 | 138 | 95 |
| Example 6 | $Li_{4x}M_{6-6x}Ti_{3+2x}O_{12}$ ($Li_2MTi_3O_8$) | Fe | 0.75 | P4$_3$32 | 170 | 2.42 | 130 | 87 |
| Example 7 | $Li_{4x}M_{6-6x}Ti_{3+2x}O_{12}$ ($Li_2MTi_3O_8$) | Co | 0.75 | P4$_3$32 | 170 | 2.42 | 130 | 90 |
| Example 8 | $Li_{4x}M_{6-6x}Ti_{3+2x}O_{12}$ ($Li_2MTi_3O_8$) | Ni | 0.75 | P4$_3$32 | 170 | 2.42 | 130 | 90 |
| Example 9 | $Li_{4x}M_{6-6x}Ti_{3+2x}O_{12}$ ($Li_2MTi_3O_8$) | Cu | 0.75 | P4$_3$32 | 170 | 2.40 | 130 | 85 |

As clearly seen from above Tables 2 and 3, the non-aqueous electrolyte batteries of Examples 1 to 8 which were equipped respectively with a negative electrode active material belonging to the P4$_3$32 space group were higher in battery operating voltage and larger in energy density as compared with the non-aqueous electrolyte battery of Comparative Example 4 which was equipped with a negative electrode containing a negative electrode active material belonging to the Fd3-m space group or compared with the non-aqueous electrolyte battery of Comparative Example 5 which was equipped with a negative electrode containing, as a negative electrode active material, spinel-type $Li_4Ti_5O_{12}$ belonging to the Fd3-m space group even though the compositions of these non-aqueous electrolyte batteries of Comparative Examples 4 and 5 were the same as that of Examples 1 to 3.

Further, in the cases where Zn, Mg or Ca was employed as the constituent element M of the aforementioned general formula, especially in the cases of the non-aqueous electrolyte batteries of Examples 1, 4 and 5 which were equipped with a negative electrode containing a negative electrode active material having a composition of the aforementioned general formula where x was set to 0.75, it will be recognized that it was possible to realize not only large energy density but also excellent charge/discharge cycle characteristics.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A non-aqueous electrolyte battery comprising:
   a positive electrode;
   a negative electrode comprising, as an active material, a titanium-containing oxide having a crystal structure belonging to the P4$_3$32 space group, wherein the titanium-containing oxide is represented by the general formula $Li_{4x+y}M_{6-6x}Ti_{3+2x}O_{12}$, wherein M is at least one element selected from Ca, Sr, and Ba; x is 0.5<x<0.95; and y is 0≦y≦6; and
   a non-aqueous electrolyte.

2. The battery according to claim 1, wherein the x in the general formula is 0.65≦x≦0.85.

3. The battery according to claim 1, wherein the x and the y in the general formula are 0.65≦x≦0.85 and y=0, respectively.

4. The battery according to claim 1, wherein the titanium-containing oxide has an average particle diameter of not more than 10 μm.

5. The battery according to claim 1, wherein the titanium-containing oxide has an average particle diameter of not less than 0.1 μm and not more than 1 μm.

6. The battery according to claim 1, wherein the titanium-containing oxide has a specific surface area of not less than 5m²/g and not more than 100 m²/g.

7. The battery according to claim 1, wherein the positive electrode comprises lithium transition metal composite oxide as a positive electrode active material and is capable of exhibiting a battery voltage of 2.45 to 2.55 V in combination with the negative electrode comprising the titanium-containing oxide represented by the general formula.

8. The battery according to claim 7, wherein the lithium transition metal composite oxide is lithium cobalt composite oxide or lithium manganese composite oxide.

9. The battery according to claim 1, wherein the non-aqueous electrolyte contains lithium salt and an organic solvent including γ-butyrolactone.

* * * * *